(12) United States Patent
Buehler et al.

(10) Patent No.: US 6,559,790 B1
(45) Date of Patent: May 6, 2003

(54) BROADBAND PASSIVE MOVING TARGET SIMULATOR

(75) Inventors: Walter E. Buehler, Issaquah; Kosal Svy, Kent, both of WA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 07/563,137

(22) Filed: Aug. 3, 1990

(51) Int. Cl.[7] ............................................... H01Q 15/00
(52) U.S. Cl. ................................................ 342/6; 342/7
(58) Field of Search ............................ 342/5, 6, 7, 9, 342/11

(56) References Cited

U.S. PATENT DOCUMENTS

| | | | |
|---|---|---|---|
| 3,142,059 A | 7/1964 | Williston | 342/171 |
| 3,308,464 A | 3/1967 | Lewis | 342/6 |
| 3,417,398 A | 12/1968 | Lewis et al. | 342/6 |
| 3,896,440 A | 7/1975 | Wheeler | 342/160 |
| 4,314,249 A | 2/1982 | Onoe | 342/6 |
| 4,843,396 A * | 6/1989 | Macikunas et al. | 342/7 |

* cited by examiner

*Primary Examiner*—John B. Sotomayor
(74) *Attorney, Agent, or Firm*—John C. Hammar

(57) ABSTRACT

The invention is a radar decoy which electronically simulates objects by generating radar detectable signals over the entire microwave frequency range. The simulator includes a series of tuned, spaced diode networks for generating carrier suppressed doppler side bands. Each diode network operates at a single, different frequency. The diode networks are enclosed by a corner reflector which modulates the amplitude and the phase of an impinging radar signal. The diode networks are controlled by a switching network which turns the diodes on and off at a desire frequency to produce a doppler frequency shift and thereby simulate moving objects.

13 Claims, 2 Drawing Sheets

BROADBAND PASSIVE MOVING TARGET SIMULATOR

BACKGROUND OF THE INVENTION

Radar decoy designers have the challenge of producing a decoy having a radar cross section which simulates moving and stationary objects of various sizes. This decoy must also simulate the radar cross section of objects exposed to a broad range of frequencies since various tracking radar used different radar frequencies.

Conventional decoys have included chaff released from a moving airplane. The problem with chaff is the strands become nearly motionless once released from the moving airplane. This motionlessness can easily be detected by conventional radar to distinguish the decoy from the moving airplane. Consequently, an effective decoy must simulate the target's radar cross section and movement over a wide range of radar frequencies.

Earlier radar decoys used a variety of techniques. The Lewis device, U.S. Pat. No. 3,380,464, achieved radar wave reflectivity by varying the conductivity of incremental reflective elements. The patented device included a large number of elements and is complex and costly. The Lewis device includes a sandwich-like reflector made of dielectric and metallic materials. The device is effective only with single polarities. The invention, unlike the Lewis device, is simpler, less costly, and uses a simple metallic reflector which is effective with radar waves having vertical and horizontal polarities components.

The Williston device, U.S. Pat. No. 3,142,059, like the Lewis device, is effective with only one radar wave polarization. Additionally, the Williston device is a mechanical design having rotary components driven by a motor. The effective radio frequency bandwith is considerably more narrow than the invention's radar decoy. Consequently, the Williston device will not simulate large and small radar cross section objects like aircraft and tanks.

The devices disclosed in the Lewis Patent, U.S. Pat. No. 3,417,398, the Wheeler Patent, U.S. Pat. No. 3,896,440, and the Onoe Patent, U.S. Pat. No. 4,314,249, are distinguishable from the invention's radar decoy by having limited radio frequency applicability, limited radar cross section simulation, and single radio frequency polarity sensitivity.

SUMMARY

The invention is a radar decoy. The decoy is an electronic simulator of objects which generates radar detectable signals over the entire microwave frequency range. The simulator includes a series of tuned, spaced, diode networks for generating carrier suppressed doppler sidebands. Each diode network is tuned to a single, different frequency so the decoy has the wide frequency range.

Each diode network is a bow-tie dipole antenna with a beam lead PIN diode connected across the antenna. Microstrip inductors are connected between each dipole antenna to radio frequency isolate each antenna from an adjacent antenna. An advantage of this antenna design is the radar decoy is effective with radio frequency waves having vertical and horizontal components. Many existing radar decoys are only effective with radio waves having a single polarization.

The diode networks are mounted in a pyramid shaped corner reflector having an open side. The corner reflector is typically made of a metallic sheet or of a material having an electrically conductive coating. The diode networks interact with the corner reflector to modulate the amplitude and phase of impinging radar signals.

The diode networks and corner reflector system simulate a moving target by generating a frequency having a doppler frequency shift. This frequency is controlled by a switching circuit which turns the diode networks on and off at a selected frequency.

An object of the invention is to be a radar decoy by simulating the radar signature of moving and stationary targets.

A feature of the invention is the radar decoy is expendable.

A second feature of the invention is the radar decoy operates over several octaves of frequency.

A third feature of the invention is the radar decoy modulates and reflects carrier frequencies up to 20 GHz compared to much lower frequencies for existing radar decoys.

A fourth feature of the invention is the radar decoy has improved modulation depth to better simulate a moving target.

A fifth feature of the invention is the radar decoy includes amplitude and phase modulation compared to conventional radar decoys which use only amplitude modulation.

An advantage of the invention is the improved simulation of moving and stationary targets making the radar decoy a more effective protector of the target simulated by the decoy. This enhanced effectiveness improves the survivability of the intended target against attacks from aircraft, missiles, or other radar guided interceptors.

DESCRIPTION OF THE PREFERRED EMBODIMENT

Figure 1:
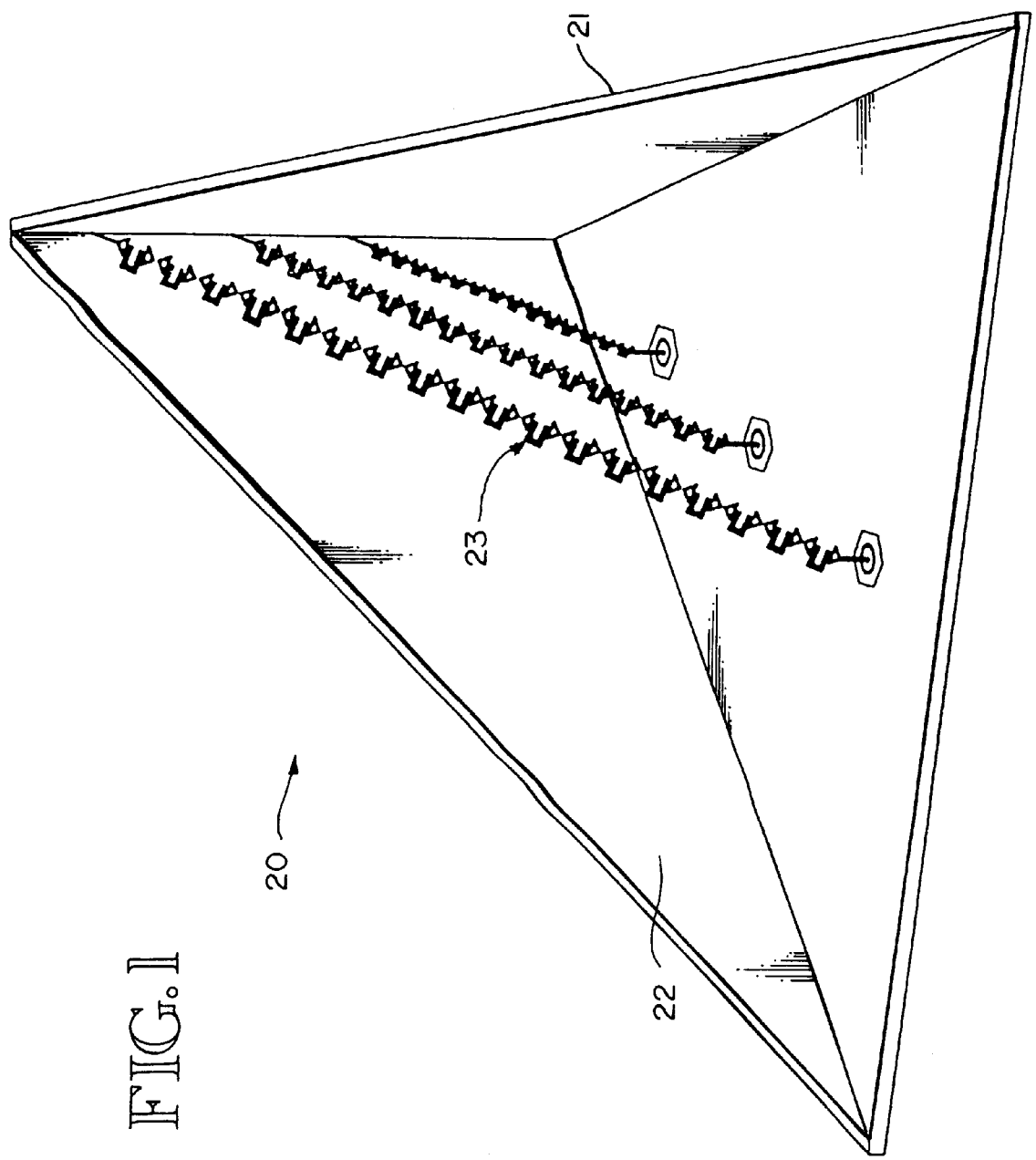
FIG. 1 is an isometric view of the invention's corner reflector and diode networks.

The radar decoy 20 (FIG. 1) includes a metallic corner reflector 21. The corner reflector 21 is a sheet of metal folded into a pyramid with an open side 22.

Mounted inside the corner reflector 20 is a series of tuned, spaced, diode networks 23. Each diode network 23 is tuned to a single, separate frequency band. The combination of these networks, according to the non-interacting superposition principle, creates a wide frequency bandwith similar to a multi-stage band pass filter.

Figure 2:
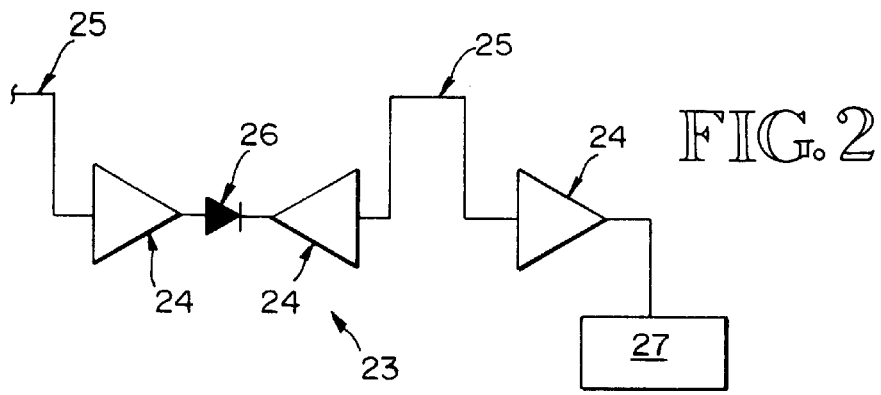
FIG. 2 schematically represents the diode network and switching circuitry.

The series of diode networks 23 (FIG. 2) is formed by bow-tie dipole antennas 24 which are radio frequency-isolated from each other by microstrip inductors 25. A beam lead PIN diode 26 is connected across each dipole antenna 24. These specific diodes are preferred over conventional diodes because the PIN diode is dimensionally smaller and has less capacitance and inductance so higher radio frequencies can be modulated. A doppler shift, used to simulate moving objects, is achieved by switching the diodes on and off at a desired frequency using switching circuit 27. The bow-tie dipole antennas 24 being installed at an inclined angle make the radar decoy 20 (FIG. 1) responsive to radio frequencies having vertical and horizontal components. This increased signal polarization sensitivity makes radar decoy 20 a more versatile and effective decoy for diverting impinging radar signals from an intended target.

The radar decoy 20 (FIG. 1) simulates targets by amplitude modulating the impinging radio frequencies from radar systems. This amplitude modulation corresponds to changes in the radar cross section of the corner reflector 21. Such changes occur by having turned on diode networks 23 obstruct the open side 22 of corner reflector 21. This obstruction reduces the amplitude of a reflected radar signal. In contrast, turned off diode networks 23 do not obstruct the open side 22 of corner reflector 21 and thereby enhance the amplitude of reflected radar signals.

The radar decoy 20 uses phase modulation to enhance the suppression of a chosen carrier frequency and improve the reception of decoy radiated signals by tracking radar. The radar decoy 20 achieves this phase modulation by separating the diode networks 23 in corner reflector 21. The distance between the diode networks 23 determines the phase differences of the signals radiated from them.

Figure 3:
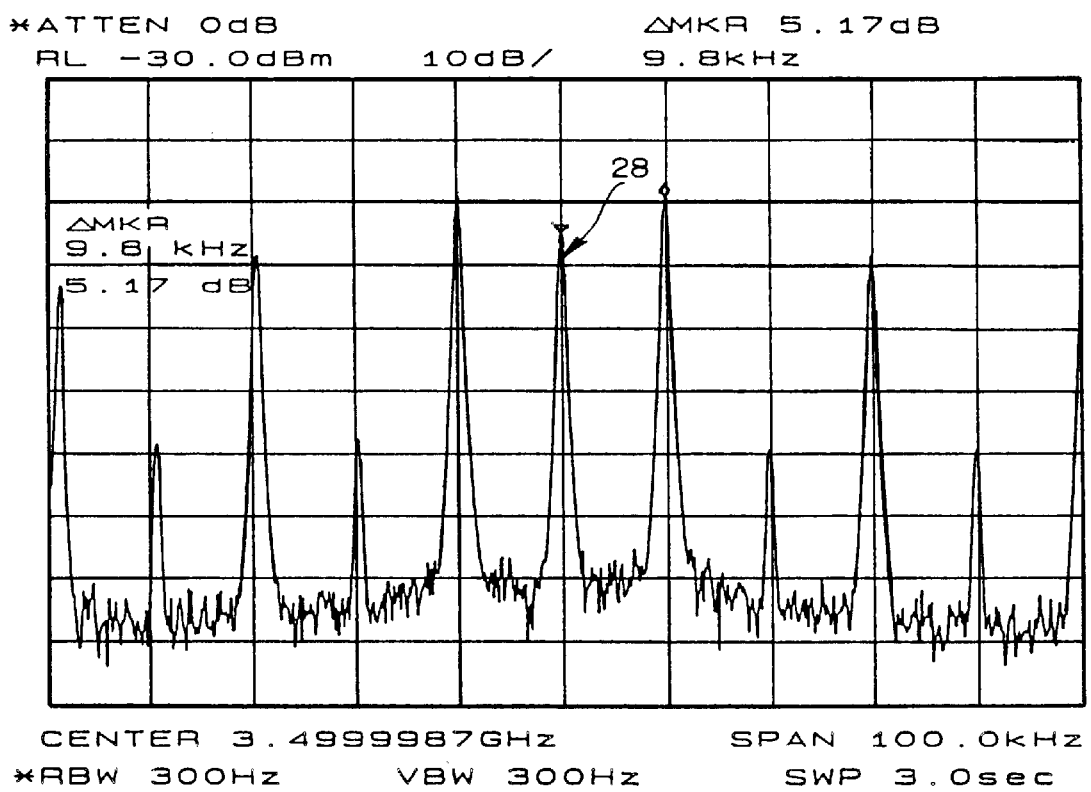
FIG. 3 graphically depicts the spectrum of the reflected radar signal from the invention.

The spectrum of FIG. 3 shows the radar signal reflected by radar decoy 20 at 3.5 GHz. The center frequency (the carrier) is suppressed and the first sidebands are 9.8 KHz away. Sidebands are generated harmonically (in multiples). For example: A 1 KHz modulating frequency will generate sidebands on a 10 GHZ carrier at 10 GHZ+1 KHz, 10 GHZ+2 KHz, 10 GHZ+3 KHz with varying amplitudes which usually decay.

A moving vehicle will generate positive sidebands on a carrier frequency proportional to the vehicle's approaching speed and negative sidebands proportional to a vehicle's receeding speed.

A truck which moves at a velocity of 50 m/sec toward a radar will generate a carrier which increases in frequency by a factor determined by the equation: velocity divided by the frequency wavelength. If the wavelength equals 3 cm, the change in frequency and doppler shift will be $50 \times \frac{1}{3} \times 10^2 = 1.666$ KHZ.

We claim:

1. An electronic simulator of objects for generating radar dectectable signals over the entire microwave frequency range, the simulator comprising:

a series of tuned, spaced, diode networks for generating carrier suppressed doppler sidebands, each network operating at a single, different frequency;

a corner reflector enclosing the networks to modulate the amplitude and phase of an impinging radar signal; and means for switching the diode networks on and off at a desire frequency to generate a doppler frequency shift.

2. The electronic simulator of claim 1, wherein the series of tuned, spaced, diode networks comprises:

bow-tie dipole antennas;

a beam lead PIN diode connected across each bow-tie antenna; and microstrip inductors between each dipole antenna to radio frequency isolate each antenna from each other antenna.

3. The electronic simulator of claim 2 wherein each tuned, spaced, dipole network is responsive to radio frequency waves having vertical and horizontal components.

4. The electronic simulator of claim 1, wherein the corner reflector is pyramid shaped and has at least one open side.

5. The electronic simulator of claim 4, wherein the corner reflector is a metallic sheet.

6. The electronic simulator of claim 4, wherein the corner reflector includes an electrically conductive surface coating.

7. An expendable radar decoy for surface and airborne objects, the decoy comprising:

a series of tuned, spaced, diode networks for generating carrier suppressed doppler sidebands over the entire the microwave frequency range, each network operating at a single, different frequency;

a corner reflector enclosing the networks to modulate the amplitude and phase of an impinging radar signal; and means for switching the diode networks on and off at the desired frequency to generate a doppler frequency shift.

8. The decoy of claim 7, wherein the series of tuned, spaced, diode networks comprises:

bow-tie dipole antennas;

a beam lead PIN diode connected across each bow-tie dipole antenna; and microstrip inductors between each dipole antenna to radio frequency isolate each antenna from each other antenna.

9. The decoy of claim 6, wherein each tuned, spaced, diode network is responsive to radio frequencies having vertical and horizontal components.

10. The decoy of claim 7, wherein the corner reflector is shaped as a pyramid having at least one open side.

11. The decoy of claim 10, wherein the corner reflector is a metallic sheet.

12. The decoy of claim 11, wherein the corner reflector includes an electrically conductive surface coating.

13. A method of electronically simulating throughout the microwave frequency range the radar cross section of surface and airborne objects, the method comprising the steps of:

fabricating a corner reflector shape as a pyramid having at least one open side;

mounting inside the corner reflector a series of spaced, diode networks;

tuning each spaced diode network to a single, different frequency;

generating carrier suppressed doppler sidebands with the diode networks;

modulating the amplitude and phase of impinging radar signals; and switching the diode networks on and off at a desired frequency to generate a doppler frequency shift.

* * * * *